(12) United States Patent
Zhang

(10) Patent No.: US 12,372,287 B2
(45) Date of Patent: Jul. 29, 2025

(54) SPHERICAL ICE MAKER

(71) Applicant: Chaomiao Zhang, Maoming (CN)

(72) Inventor: Chaomiao Zhang, Maoming (CN)

( * ) Notice: Subject to any disclaimer, the term of this patent is extended or adjusted under 35 U.S.C. 154(b) by 212 days.

(21) Appl. No.: 18/456,499

(22) Filed: Aug. 27, 2023

(65) Prior Publication Data

US 2024/0344749 A1     Oct. 17, 2024

(30) Foreign Application Priority Data

Apr. 14, 2023 (CN) .......................... 202320831739.1

(51) Int. Cl.
*F25C 1/22* (2018.01)
*F25C 1/04* (2018.01)

(52) U.S. Cl.
CPC . *F25C 1/22* (2013.01); *F25C 1/04* (2013.01)

(58) Field of Classification Search
CPC ........... F25C 1/04; F25C 1/22; F25C 2400/06
See application file for complete search history.

(56) References Cited

U.S. PATENT DOCUMENTS

| 9,074,803 B2* | 7/2015 | Culley ...................... F25C 5/08 |
| 2017/0082338 A1* | 3/2017 | Wobrock .................. F25C 1/22 |
| 2021/0381738 A1* | 12/2021 | Cran ......................... F25C 1/25 |

\* cited by examiner

*Primary Examiner* — Cassey D Bauer
(74) *Attorney, Agent, or Firm* — Zhu Lehnhoff LLP

(57) ABSTRACT

A spheric ice maker, relating to the technical field of ice making equipment, includes a water measuring device and a driver bracket, in which a driver bracket includes an evaporator lower bracket, an evaporator, an evaporator lower cover, an evaporator front cover, and an evaporator bracket. The evaporator lower bracket and the evaporator lower cover are connected to each other to form an integrity with a closed cavity, the evaporator lower cover has an accommodating tank communicated with the closed cavity, and a lower hemispherical mold with an opening end protruding outwards from the evaporator lower cover is housed in the accommodating tank, which lower hemispherical mold is seal fitted to the evaporator lower cover, and the evaporator is mounted between the evaporator lower bracket and the evaporator lower cover and is sleeved on an outer wall of the lower hemispherical mold.

7 Claims, 5 Drawing Sheets

SPHERICAL ICE MAKER

REFERENCE TO RELATED APPLICATIONS

The present application claims the priority of Chinese patent application No. 202320831739.1, filed on Apr. 14, 2023, the entire disclose of which is incorporated herein by reference.

FIELD OF THE DISCLOSURE

The present disclosure relates to the technical field of ice making equipment, in particular, to a spherical ice maker.

BACKGROUND OF THE DISCLOSURE

Clear spherical ice pieces have become popular and are used in bourbon, scotch, whiskey, craft cocktails, soft drinks, and other drinks. The clear spherical ice piece is desirable for use in such drinks because of its slow melting rate, large surface area, and attractive visual appearance.

Spherical ice pieces can be made through an ice-sphere-making system. US20190293335A1 discloses an ice-sphere-making system, which can be further optimized and improved because 1) the overall structure is complex, and it is provided with a complex transmission structure including such parts as driving gears, drive shafts, driven shafts, gears and splines, causing a high cost, and 2) it is not easy to separate the ice balls from the mold after the ice making is completed.

SUMMARY OF THE DISCLOSURE

The object of the present disclosure is to provide a spherical ice maker, which can effectively solve the problems in the background art.

The technical solution to achieve the above object lies in a spherical ice maker, characterized in including a water measuring device and a driver bracket, in which driver bracket are sequentially provided an evaporator lower bracket, an evaporator, an evaporator lower cover, an evaporator front cover, and an evaporator bracket;

The evaporator lower bracket and the evaporator lower cover are connected to each other to form an integrity with a closed cavity, the evaporator lower cover is provided with an accommodating tank communicated with the closed cavity, and a lower hemispherical mold with an opening end protruding outwards from the evaporator lower cover is housed in the accommodating tank, which lower hemispherical mold is seal fitted to the evaporator lower cover, and the evaporator is mounted between the evaporator lower bracket and the evaporator lower cover and is sleeved on an outer wall of the lower hemispherical mold;

The evaporator front cover includes an upper hemispherical mold matched with the lower hemispherical mold, the upper hemispherical mold being connected to the evaporator bracket;

A driver is mounted on the driver bracket to drive the upper hemispherical mold on the evaporator bracket to combine with or separate from the corresponding lower hemispherical mold, and a closed ice-making cavity is formed when the upper hemispherical mold and the lower hemispherical mold are combined, and the water measuring device is communicated with the ice-making cavity through an electromagnetic water valve.

Further, the evaporator lower bracket is a rectangular box open on one side, and the evaporator lower cover is seal connected with the opening end of the evaporator lower bracket to form a closed cavity.

Further, the driver is provided with a drive motor, which is mounted at an end of the driver bracket, the drive motor having an output end connected with a screw parallel to a moving direction of the evaporator bracket, a screw nut being provided on a side wall of the evaporator bracket in threaded connection with the screw.

Further, a guide rod is arranged in the driver bracket, on which the evaporator front cover is slidably mounted through a guide sleeve.

Further, a slide groove parallel to the direction of the screw is provided at a center position of the upper hemispherical mold, and an ejector rod is slidably arranged in the slide groove, and the evaporator bracket is provided with a through hole slidingly fitted to the ejector rod, the ejector rod passing through the through holes in the evaporator bracket;

A limit ring is arranged on the ejector rod between the evaporator bracket and the upper hemispherical mold, and a spring is arranged between the upper hemispherical mold and the limit ring to push the ejector rod outward to retract into the slide groove;

An ice ejector pin coaxially arranged with the ejector rod is provided on an end surface of an inner side of the driver bracket, which is used to push the ejector rod to compress the spring and push out the ice ball in the upper hemispherical mold when the driver drives the upper hemispherical mold to separate from the lower hemispherical mold.

Further, a water spray pipe penetrates the evaporator bracket, with one end extending out of the evaporator bracket and used to connect a water source, and the other end as a closed structure provided with plurality of spray holes in a downward alignment with the upper hemispherical mold.

Further, the evaporator is correspondingly connected with a refrigeration system including a condenser, a compressor and an expansion valve that are connected in series sequentially, and meanwhile an output end of the compressor is connected to an input end of the evaporator by a control valve.

Beneficial Effects of the Present Disclosure

Compared with the background art, the present disclosure has the advantages of simple structure and low cost.

The present disclosure utilizes the thermal energy of the compressor and the temperature difference between the water and the ice balls to separate the ice balls from the ice-making mold, and then completely ejects the ice balls through the ice ejector pin, which has a high level of automation.

DETAILED DESCRIPTION OF THE EMBODIMENT(S) OF THE DISCLOSURE

Figure 1:
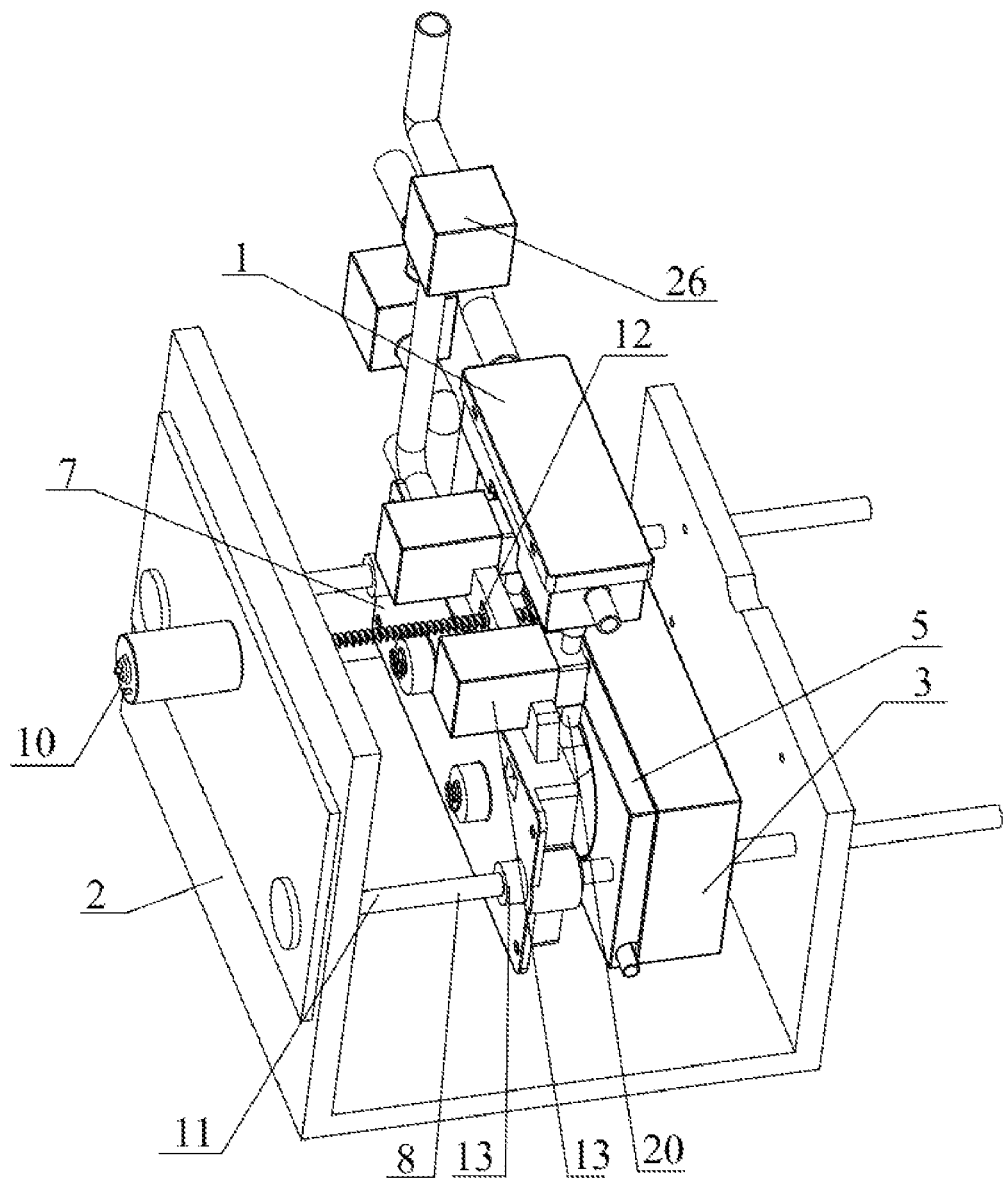
FIG. 1 is a structural schematic view of the present disclosure.
Figure 2:
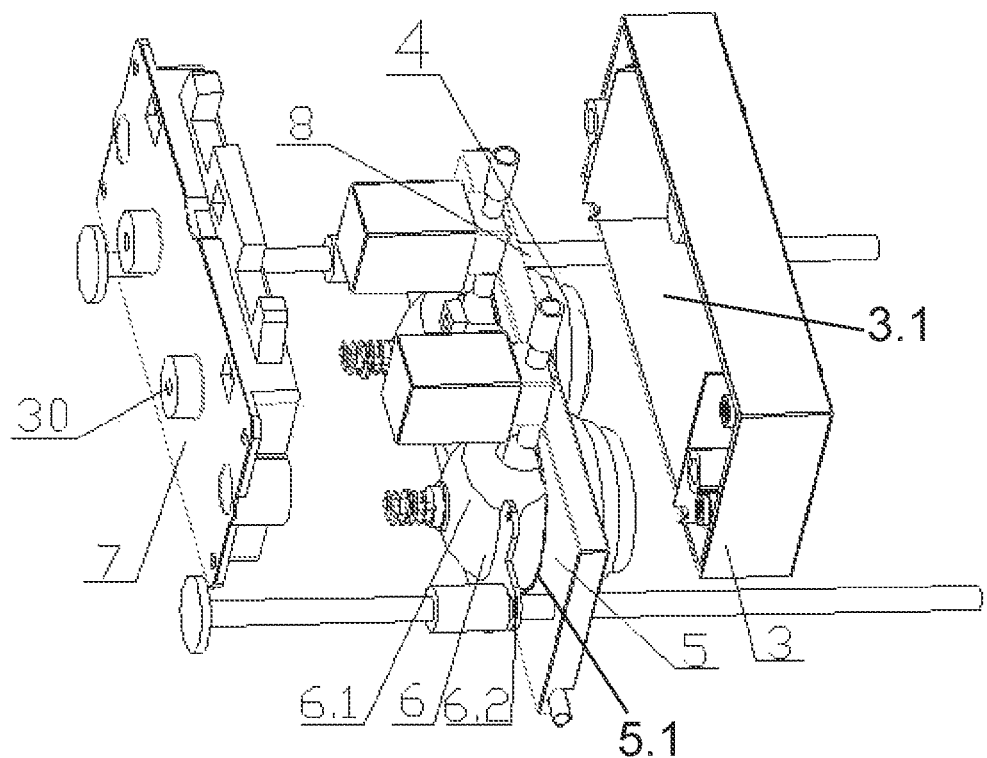
FIG. 2 is the first partial schematic view of the present disclosure.
Figure 3:
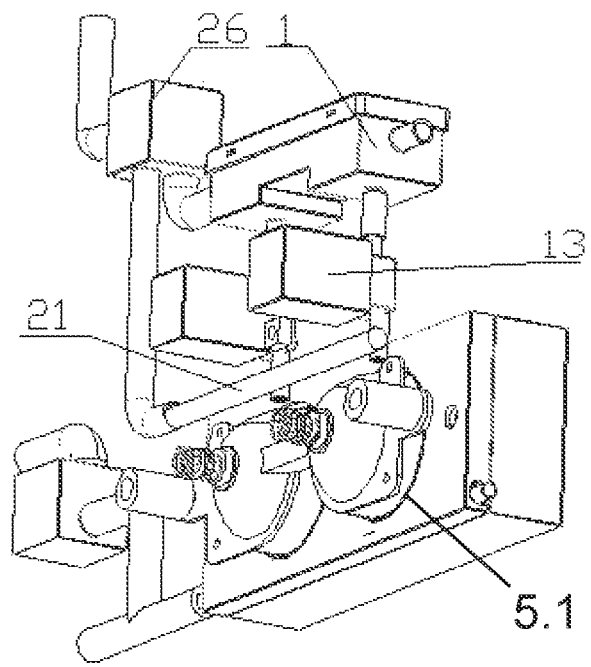
FIG. 3 is the second partial schematic view of the present disclosure.
Figure 4:
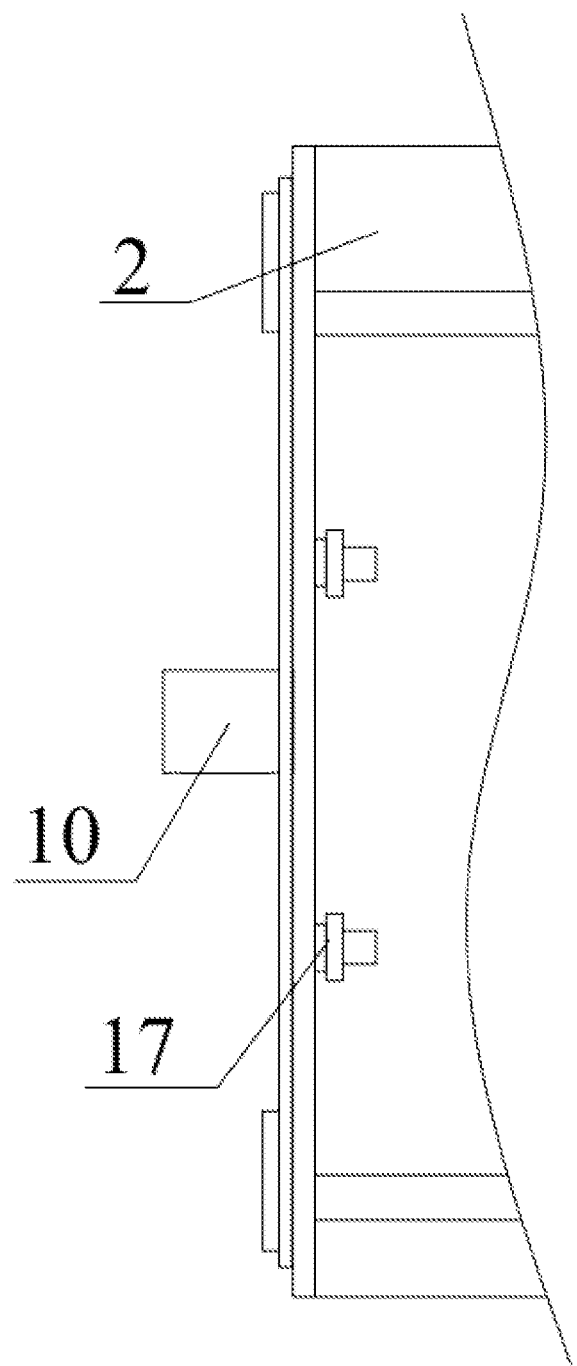
FIG. 4 is the third partial schematic view of the present disclosure.
Figure 5:
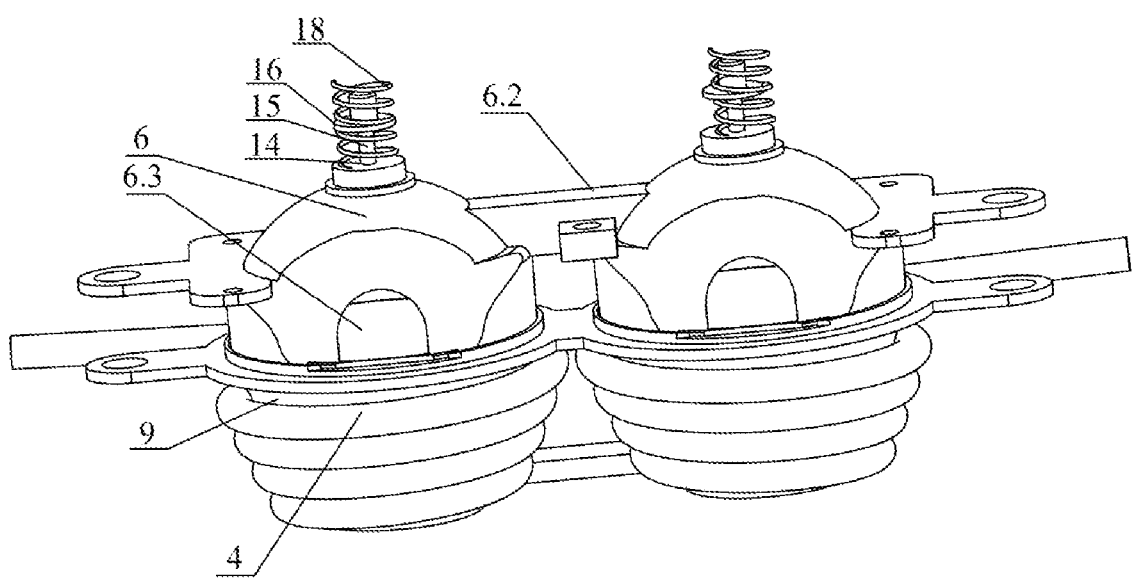
FIG. 5 is the fourth partial schematic view of the present disclosure.
Figure 6:
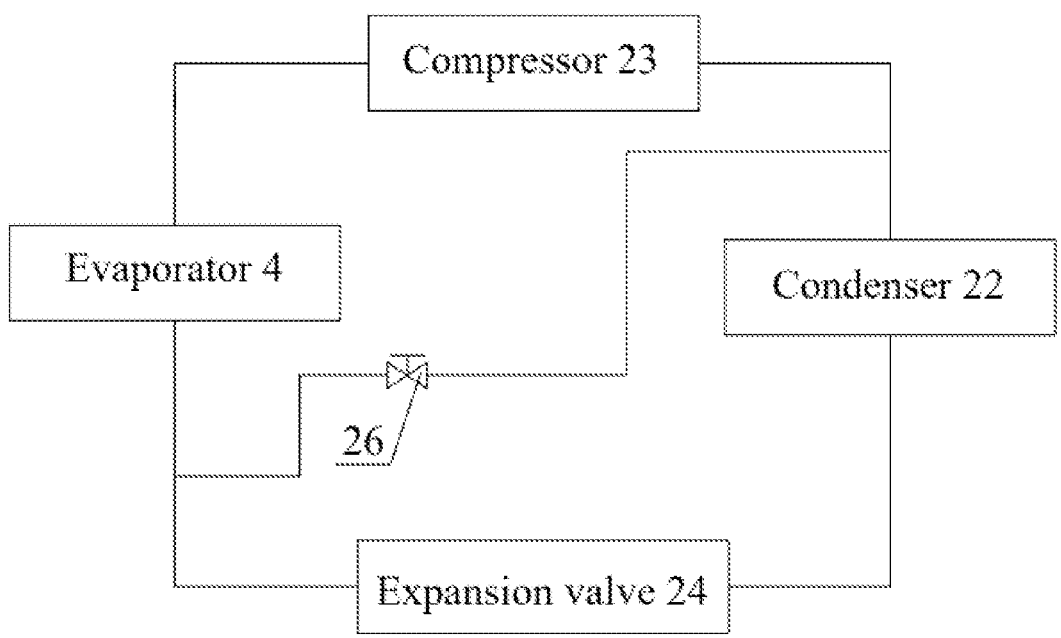
FIG. 6 is a schematic view of the refrigeration principle of the present disclosure.

As shown in FIGS. 1-6, the present disclosure includes a water measuring device 1 and a driver bracket 2. The water measuring device 1 is a water measuring vessel with an upward opening for adding water of 8 ML~10 ML each time. The cross section of the driver bracket 2 is a rectangle open on one side. Two sides of the driver bracket 2 are symmetrically provided with guide rods 8, between which guide rods an evaporator bracket 7, an evaporator front cover 6, an evaporator lower cover 5, an evaporator 4 and an evaporator lower bracket 3 are sequentially arranged. The evaporator lower bracket 3 is a rectangular box open on one side. The evaporator lower cover 5 is seal connected with the opening end of the evaporator lower bracket 3 to form a closed cavity 3.1 and is fixedly connected between the guide rods 8. The evaporator lower cover 5 is provided with an accommodating tank 5.1 communicated with the closed cavity 3.1. A lower hemispherical mold 9 with an opening end protruding outwards from the evaporator lower cover 5 is housed in the accommodating tank 5.1, which lower hemispherical mold 9 is seal fitted to the evaporator lower cover 5. The evaporator 4, which is in a spiral shape, is seal mounted between the evaporator lower bracket 3 and the evaporator lower cover 4 and is sleeved on an outer wall of the lower hemispherical mold 9.

The evaporator front cover 6 is connected to the side of the evaporator bracket 7 facing the evaporator lower cover 5, and slides through a guide sleeve 13 to pass between the guide rods 8. The evaporator front cover 6 includes an upper hemispherical mold 6.1 fitted to the lower hemispherical mold 9. The upper hemispherical mold 6.1 is connected to the evaporator bracket 7 through a connecting plate 6.2.

A driver is mounted on the driver bracket 2 to drive the upper hemispherical mold 6.1 on the evaporator bracket 7 to combine with or separate from the corresponding lower hemispherical mold 9. The driver is provided with a drive motor 10 mounted on an end of the driver bracket 2 close to the evaporator bracket 7. An output end of the drive motor 10 is connected with a screw 11 parallel to a moving direction of the evaporator bracket 2, and on a side wall of the evaporator bracket 2 is provided a screw nut 12 threadedly connected with the screw 11.

An ice-making cavity is formed when the upper hemispherical mold 6.1 and the lower hemispherical mold 9 are combined. The upper hemispherical mold 6.1 is provided with a water inlet. An outlet end of the water measuring device 1 is connected with an electromagnetic water valve 19, which is mounted on a side wall of the evaporator bracket 7 via the bracket. An outlet end of the electromagnetic water valve 19 is provided with a water outlet pipe 20. A water outlet of the water outlet pipe 20 is aligned downward with the water inlet of the upper hemispherical mold 6.1, and an water outlet end of the water outlet pipe 20 is clearance fitted to the spherical surface of the upper hemispherical mold 6.1.

A water spray pipe 21 penetrates the evaporator bracket 7, with one end extending out of the evaporator bracket 7 and used to connect a water source, and the other end as a closed structure provided with plurality of spray holes in a downward alignment with the upper hemispherical mold 6.1.

A slide groove 14 parallel to the direction of the screw 11 is provided at a center position of the upper hemispherical mold 6.1, in which an ejector rod 15 is slidably arranged. The evaporator bracket 7 is provided with a through hole 30 which is slidably fitted to the ejector rod 15. The ejector rod 15 passes through the through hole 30 on the evaporator bracket. A limit ring 16 is provided on the ejector rod 15 between the evaporator bracket 7 and the upper hemispherical mold 6.1. A spring 18 is provided between the upper hemispherical mold 6.1 and the limit ring 16, which is used to push the ejector rod 15 outward to retract into the slide groove 14.

An ice ejector pin 17 coaxially arranged with the ejector rod 15 is fixedly provided on an inner wall of the one end of the driver bracket 2 where the driver is installed, and the ice ejector pin 17 is used to push the ejector rod 15 to compress the spring 18 and push out the ice ball in the upper hemispherical mold 6.1 when the driver drives the upper hemispherical mold 6.1 to separate from the lower hemispherical mold 9.

The evaporator 4 is correspondingly connected with a refrigeration system. The refrigeration system includes a condenser 22, a compressor 23, and an expansion valve 24. The compressor 23, the condenser 22, the expansion valve 24, and the evaporator 4 are sequentially connected in series. Meanwhile, an output end of the compressor 23 is connected to an input end of the evaporator 4 through an electromagnetic gas valve 26.

As a further illustration of this embodiment, the ice maker of the present disclosure can be arranged horizontally or vertically. No matter whether the ice maker is horizontally arranged or vertically arranged, the water outlet of the water outlet pipe 20 shall be aligned downwards with the water inlet of the upper hemispherical mold 6.1, the spray holes of the water spray pipe 21 also shall be aligned downwards with the upper hemispherical mold 6.1, and the opening end of the water measuring device 1 shall be arranged upwards. In addition, as actually required, there could be a plurality of ice-making cavities formed by combining the upper hemispherical mold 6.1 with the lower hemispherical mold 9, and each ice-making cavity is connected to the water measuring device 1 through the electromagnetic water valve 19.

In this embodiment, the working process of the present disclosure is specifically described below with the horizontal arrangement of the ice maker:

1) Drive the screw 11 to rotate by the drive motor 10, the screw 11 driving the screw nut 12 to move closer to the side of the lower hemispherical mold 9, and the screw nut 12 driving the upper hemispherical mold 6.1 connected to the evaporator bracket 7 into combination with the lower hemispherical mold 9 to form an ice-making cavity.

2) The compressor 23 works, the electromagnetic gas valve 26 is closed, and the temperature of the ice-making cavity formed by the combination of the lower hemispherical mold 9 and the upper hemispherical mold 6.1 drops to about minus 25° C.

3) The electromagnetic water valve 19 is activated to inject the water in the water measuring device 1 into the ice-making chamber nine times, and the water is continuously injected three times first, and then the water is injected every 3 minutes from the $3^{rd}$ minute after the injection, for a total of 3 times, and the water is injected at the $9^{th}$ minute after the sixth injection (which is the seventh injection), and eighth injection occurs at the sixth minute after the seventh injection, and the next water injection lasts five seconds at the fifth minute after the eighth injection (this injection is to flush the ice higher than the spheric surface at the water inlet to keep it beautiful).

4) The ice-making takes about 31 minutes. After the ice-making is completed, the electromagnetic gas valve 26 is opened to transfer the thermal refrigerant of the compressor 23 into the evaporator 4 to heat the evaporator 4, so that the ice ball can be released from the lower hemispherical mold 9.

5) After the electromagnetic gas valve 26 has been opened for 40 seconds, the drive motor 10 starts to work, driving the hemispherical mold 6.1 connected to the evaporator front cover 6 to separate from the lower hemispherical mold 9, and from the $10^{th}$ second before the work of the drive motor 10, the water spray pipe 21 starts to spray water, which has a temperature higher than that in the ice-making chamber, so that the ice ball separates from the upper hemispherical mold 6.1.

If the drive motor 10 drives the upper hemispherical mold 6.1 of the evaporator front cover 6 to move and the ice ball in the upper hemispherical mold 6.1 has not been separated, the ejector rod 17 is pushed by the ice ejector pin 17 to compress the spring 18 and push out the ice ball in the upper hemispherical mold 6.1.

The invention claimed is:

1. A spherical ice maker, comprising a water measuring device and a driver bracket, wherein the driver bracket is sequentially provided with an evaporator lower bracket, an evaporator, an evaporator lower cover, an evaporator front cover, and an evaporator bracket;

wherein the evaporator lower bracket and the evaporator lower cover are connected to each other to form an integrity with a closed cavity, the evaporator lower cover is provided with an accommodating tank communicated with the closed cavity, and a lower hemispherical mold with an opening end protruding outwards from the evaporator lower cover is housed in the accommodating tank, the lower hemispherical mold is seal fitted to the evaporator lower cover, and the evaporator is mounted between the evaporator lower bracket and the evaporator lower cover and is sleeved on an outer wall of the lower hemispherical mold;

wherein the evaporator front cover comprises an upper hemispherical mold matched with the lower hemispherical mold, the upper hemispherical mold being connected to the evaporator bracket; and wherein a driver is mounted on the driver bracket to drive the upper hemispherical mold on the evaporator bracket to combine with or separate from the corresponding lower hemispherical mold, and a closed ice-making cavity is formed when the upper hemispherical mold and the lower hemispherical mold are combined, and the water measuring device is communicated with the ice-making cavity through an electromagnetic water valve.

2. The spherical ice maker according to claim 1, wherein the evaporator lower bracket is a rectangular box open on one side, and the evaporator lower cover is seal connected with the opening end of the evaporator lower bracket to form the closed cavity.

3. The spherical ice maker according to claim 1, wherein the driver is provided with a drive motor, which is mounted at an end of the driver bracket, the drive motor having an output end connected with a screw parallel to a moving direction of the evaporator bracket, a screw nut being provided on a side wall of the evaporator bracket in threaded connection with the screw.

4. The spherical ice maker according to claim 3, wherein a guide rod is arranged in the driver bracket, on which the evaporator front cover is slidably mounted through a guide sleeve.

5. The spherical ice maker according to claim 3, wherein a slide groove parallel to the direction of the screw is provided at a center position of the upper hemispherical mold, and an ejector rod is slidably arranged in the slide groove, and the evaporator bracket is provided with a through hole slidingly fitted to the ejector rod, the ejector rod passing through the through hole in the evaporator bracket;

a limit ring is arranged on the ejector rod between the evaporator bracket and the upper hemispherical mold, and a spring is arranged between the upper hemispherical mold and the limit ring to push the ejector rod outward to retract into the slide groove;

an ice ejector pin coaxially arranged with the ejector rod is provided on an end surface of an inner side of the driver bracket, which is used to push the ejector rod to compress the spring and push out a ice ball in the upper hemispherical mold when the driver drives the upper hemispherical mold to separate from the lower hemispherical mold.

6. The spherical ice maker according to claim 1, wherein a water spray pipe penetrates the evaporator bracket, with one end extending out of the evaporator bracket and used to connect a water source, and the other end as a closed structure provided with plurality of spray holes in a downward alignment with the upper hemispherical mold.

7. The spherical ice maker according to claim 1, wherein the evaporator is correspondingly connected with a refrigeration system including a condenser, a compressor and an expansion valve that are connected in series sequentially, and meanwhile an output end of the compressor is connected to an input end of the evaporator by a control valve.

* * * * *